Jan. 27, 1970   E. H. AUGUSTIN ET AL   3,492,108
CHAMBER FOR THE MANUFACTURE OF FLOAT GLASS
WITH DIVERGING SIDEWALL BLOCKS
Filed Aug. 28, 1967   3 Sheets-Sheet 1

EUGENE H. AUGUSTIN
KENNETH E. COBURN
ROBERT J. GREENLER
INVENTORS

BY John R. Faulkner
William E. Johnson
ATTORNEYS

Jan. 27, 1970  E. H. AUGUSTIN ET AL  3,492,108
CHAMBER FOR THE MANUFACTURE OF FLOAT GLASS
WITH DIVERGING SIDEWALL BLOCKS
Filed Aug. 28, 1967  3 Sheets-Sheet 2

EUGENE H. AUGUSTIN
KENNETH E. COBURN
ROBERT J. GREENLER
INVENTOR

BY
ATTORNEYS

EUGENE H. AUGUSTIN
KENNETH E. COBURN
ROBERT J. GREENLER
INVENTORS

ATTORNEYS

United States Patent Office 3,492,108
Patented Jan. 27, 1970

3,492,108
CHAMBER FOR THE MANUFACTURE OF FLOAT GLASS WITH DIVERGING SIDEWALL BLOCKS
Eugene H. Augustin, Dearborn Heights, Kenneth E. Coburn, Franklin, and Robert J. Greenler, Monroe, Mich., assignors to Ford Motor Company, Dearborn, Mich., a corporation of Delaware
Filed Aug. 28, 1967, Ser. No. 663,802
Int. Cl. C03b 18/02
U.S. Cl. 65—182                         2 Claims

ABSTRACT OF THE DISCLOSURE

Molten glass is continuously supplied to a pool of glass floating upon a molten tin bath in an enclosed chamber. The bath is contained in a cavity defined by refractory ceramic bottom blocks with a liner of graphite material overlying these blocks. The molten glass flows out of the pool in a direction downstream of the chamber to form a glass ribbon. The edges of the ribbon diverge from one another as the ribbon moves downstream in the flow-out zone of the chamber. The refractory sidewalls of the flow-out zone of the chamber are contoured to remain a substantially fixed distance from the edges of the glass ribbon and to diverge from one another at a rate substantially equal to the rate of divergence of the edges of the glass ribbon, whereby the thickness of the sidewalls of the chamber decreases from the entrance of the chamber in a direction downstream of the chamber. Thus the heat loss from the flow-out zone of the chamber through the sidewalls of the chamber is substantially reduced by increasing the thickness of the sidewalls and reducing the width of both the graphite liner and the tin in the flow-out zone.

BACKGROUND OF THE INVENTION

This invention relates to the construction of a chamber for utilization in the manufacture of flat glass by the so-called "float process." In the "float process" molten glass is poured on the surface of a molten bath contained in a chamber to obtain a glass ribbon having true parallelism of its opposite faces and a lustrous, fire-polished finish.

Generally, in the "float process" the molten bath is formed from metal having a density greater than that of molten glass. By known means, the molten glass is delivered at a uniform rate to the surface of the molten bath to form a ribbon of glass. The ribbon is then advanced along the surface of the bath under thermal conditions which permit the leading portion thereof to continuously harden to a degree sufficient to permit its removal from the bath without harming the surfaces thereof. Upon its removal from the chamber, the ribbon of glass passes through an annealing lehr and is subjected to further conventional processing.

The molten bath, which supports the glass, is contained within a substantially enclosed chamber having upper and lower refractory sections joined by side and end wall structures. The end wall structures have therein entrance and exit passageways through which, respectively, the molten glass is fed to and the glass ribbon removed from the chamber. The lower refractory section forms the container for receiving and supporting the molten metal bath. The space within the chamber above the bath is filled with a protective atmosphere to prevent oxidation of the metal forming the bath.

The "float process" of manufacturing glass has been improved by lining at least a portion of the chamber containing the molten metal bath with slabs of a carbonaceous material. Such slabs, usually made from graphite, are positioned in the chamber in a manner and for a purpose more fully disclosed in co-pending U.S. patent application S.N. 497,949, filed Oct. 19, 1965 and now U.S. Patent 3,393,061 assigned to the same assignee as this application.

When molten glass is poured out on the molten metal bath of the chamber in the initial or flow-out zone of the chamber, the molten glass diverges as it proceeds down the length of the flow-out zone to form a ribbon of glass. The prior art glass processing chambers provided floating refractory tiles in the corners of the flow-out zone of the rectangular shaped, molten metal bath. These refractory tiles floated on the metal bath but were anchored adjacent the side refractory walls of the chamber thereby to define a sidewall floating on the metal bath, which sidewall partially covered the molten bath in the areas where no glass flows thereover. However, in the prior art type of chamber construction, the molten tin bath and the carbonaceous material utilized as a liner under the tile extended, in the flow-out zone, all the way to the refractory sidewalls of the chamber. As such, heat conducted to the sidewalls of the chamber by the carbanaceous liner and the molten metal bath was at least partially dissipated from the flow-out zone of the chamber through the sidewalls and bottom of the chamber.

SUMMARY OF THE INVENTION

This invention is directed to a chamber for utilization in the "float process" of manufacturing glass and, more particularly, the invention is directed to the construction of such chamber which reduces the heat losses from the flow-out zone thereof and insures a more uniform center to edge temperature profile across a glass ribbon forming in that zone.

The chamber for manufacturing glass is constructed in accordance with the principles and teachings of this invention in the following manner. Refractory ceramic material is utilized to define a cavity, the cavity receiving molten tin therein which defines a bath for receiving a glass ribbon thereupon. The glass ribbon is formed by pouring molten glass out upon the tin bath to form a pool of glass in the entrance or flow-out zone of the chamber. The molten glass flows out of the molten pool of glass in a direction downstream of the chamber to form the glass ribbon, the edges of the glass ribbon diverging from one another as the ribbon moves downstream. The refractory ceramic material defines, on each side of the chamber, a sidewall extending upwardly from the bottom of the cavity to a position above the molten tin contained in the cavity. The sidewalls diverge from one another in a direction downstream of the flow-out zone of the chamber at a rate substantially equal to the rate of divergence of the edges of the glass ribbon. The sidewalls begin at a position spaced laterally from the initial area of the molten pool of glass so that as the glass flows out of the pool and diverges to form the ribbon, the edges of the ribbon will not contact the sidewalls of the chamber. The edges of the ribbon remain a substantially uniform distance from the diverging sidewalls at least along the flow-out zone of the chamber.

By utilizing such a construction, the chamber of this invention eliminates the presence of molten tin and carbonaceous material beneath the portions of the bath formerly covered by floating tiles and provides a greater volume of insulating, refractory material between the outer chamber walls, which are cold, and the central portion of the chamber, which is maintained at a relatively high temperature. As such, the amount of heat lost from the flow-out zone of the chamber is substantially reduced and the process becomes more economical in that the amount of additional heat which must be supplied to the flow-out zone is reduced. Also, a more uniform temperature profile is established across the width of the glass ribbon in the flow-out zone as the temperature profile across the bath is more uniform.

DESCRIPTION OF THE PREFERRED EMBODIMENT

Figure 1:
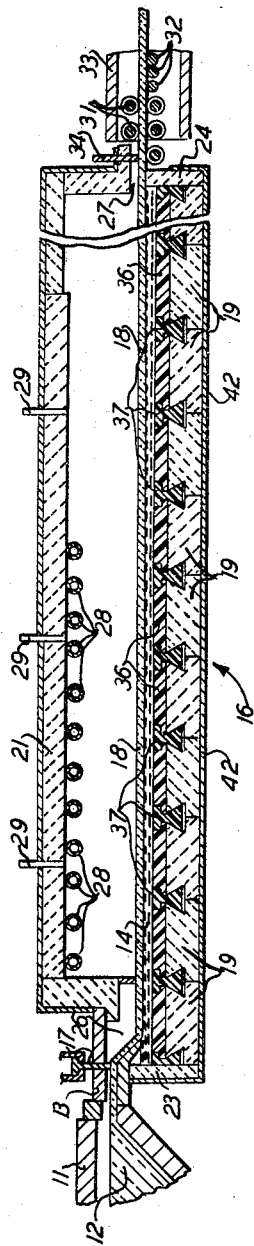
FIGURE 1 is an elevational view, in cross section, showing the improved chamber of this invention for utilization in the manufacture of flat glass.

Referring now to the drawings, in FIGURE 1 there is seen the delivery end of a conventional glass melting furnace 11 in which a constant level of glass 12 is maintained. The molten glass 12 is delivered through a forehearth 13 onto the surface of a molten metal bath 14 contained within a chamber, generally designated by the numeral 16. A tweel 17 controls the rate of glass 12 flowing from the furnace 11. The molten bath 14 has a density greater than that of the glass 12 so that the glass will float on the surface thereof. By delivering molten glass at a constant rate and by withdrawing a continuous sheet of glass thus formed at a constant rate, a continuous ribbon of glass 18 of uniform width is produced.

The chamber 16 comprises a lower refractory section formed of a plurality of refractory blocks 19, an upper refractory section 21, refractory side blocks 22 and refractory walls 23 and 24, all of which refractory walls or sections are both formed from a plurality of refractory blocks and joined together except for a restricted entrance 26 and exit 27 to provide the substantially enclosed chamber 16. The refractory side blocks 22 and the refractory end walls 23 and 24 project above the top surface of the lower refractory section to define the container for receiving and supporting the bath of molten tin 14.

To maintain the tin in a molten condition and the glass ribbon 18 at the proper temperatures required to form a ribbon of good optical quality, electrical heaters 28 (FIGURE 1) are installed in the upper refractory section 21 of the chamber 16. Coolers may also be provided in zones of the chamber 16 to insure that the glass ribbon 18 will be sufficiently cooled and hardened to be removed through the exit 27 without damage to the ribbon. The electrical heaters 28 are connected to a conventional power source (not shown) and may be individually controlled to provide the desired thermal gradient between various zones of the chamber thereby to obtain the desired rate of cooling of the ribbon as it progresses through the zones of the chamber. Preferably, the molten glass 12 is introduced into the chamber 16 at a temperature of at least 1850° F. and then, as the glass solidifies to form the ribbon 18, it is progressively cooled to a temperature of about 1100° F. at the exit 27.

An atmospheric gas is introduced into the chamber 16 through gas inlets 29 in order to provide a protective atmosphere within the chamber above the molten tin and the glass floating thereupon. The atmosphere gas should be inert toward both carbonaceous material and the tin making up the bath and actively reducing toward oxygen and tin oxide. Also, the atmosphere gas should contain not more than traces of oxygen, carbon dioxide or water vapor. As more fully described in U.S. Patent 3,332,763, issued July 25, 1967, and assigned to the same assignee as this application, a protective atmosphere consisting essentially of, by volume, 4% carbon monoxide, 4% hydrogen and the remainder nitrogen is the preferred inert atmosphere. The cooled glass ribbon 18 is withdrawn by driven traction rolls 31 onto a conveyor 32 to enter an annealing lehr 33 where the ribbon 18 is further cooled under controlled conditions to remove or reduce residual stresses therein. The exit 27 of the chamber 16 may be provided with a sealing member 34 to retain the protective atmosphere gas in and prevent outside atmosphere gases from entering the chamber.

Figure 2:
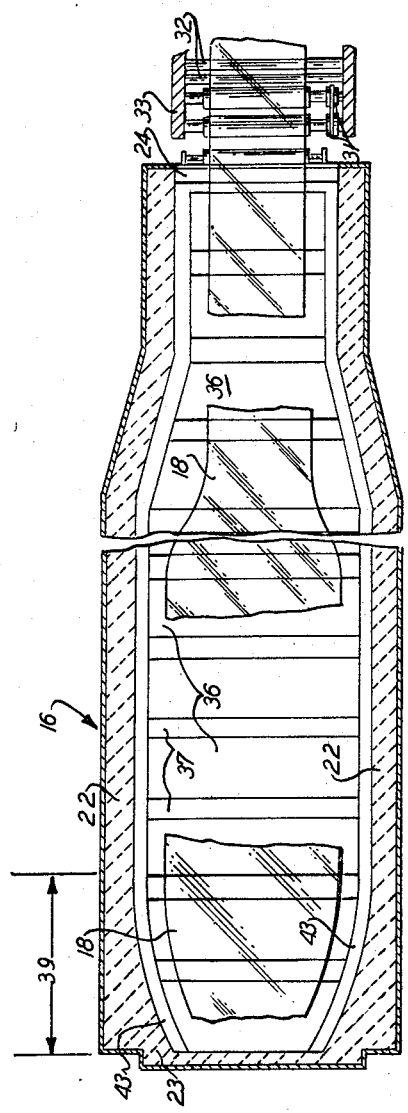
FIGURE 2 is a plan view, in cross section, of the improved chamber of FIGURE 1.

As described in previously mentioned co-pending patent application S.N. 497,949, a series of rectangular slabs 36, preferably of solid carbonaceous material such as graphite, are provided in the chamber 16. As best seen in FIGURE 2, the slabs 36 are installed so as to cover the entire bottom area of the chamber.

Figure 5:
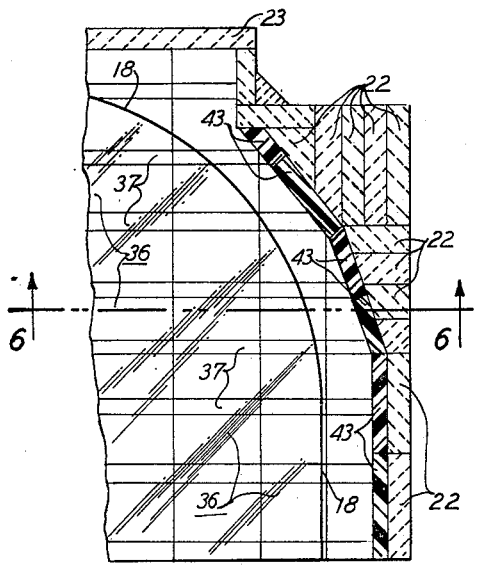
FIGURE 5 is a partial, plan view of the construction of the improved chamber of this invention.
Figure 6:
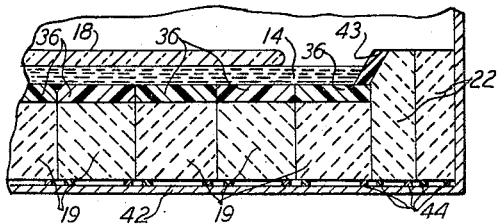
FIGURE 6 is a cross sectional view taken along line 6—6 of FIGURE 5 showing the improved chamber of this invention in greater detail.

As is best seen in FIGURES 5 and 6, the individual slabs 36 are installed so as to be coextensive with individual refractory block 19 defining the lower refractory section. More particularly, the number of slabs 36 utilized to line one width of the chamber 16 is such that there is a single slab located above and covering each of the refractory blocks 19 necessary to define one transverse width of the lower refractory section. The slabs 36 are coextensive with the refractory blocks such that upon utilization of the chamber if any upheaval in the lower refractory section occurs, the individual liner slabs 36 will readily adjust to the situation and there will be no buckling or cracking of a unitary piece of graphite material.

With reference to FIGURES 1 and 5, each transverse series of slabs 36 is held in position by transversely extending keys 37. As best seen in FIGURE 5, the keys are generally shorter in length than the slabs 36 and a greater number of keys 37 extend transversely across the chamber. The manner of utilizing the keys and the slabs is described in the above-mentioned co-pending patent application S.N. 497,949. The keys 37 are made from the same material as the slabs 36.

The slabs 36 and keys 37, since they are preferably made from graphite which is substantially less dense than tin, are raised above the lower refractory section 19 by a buoyant force exerted thereon by the molten tin. Graphite slabs and keys do not rise to the top surface of the tin and float thereupon because of the manner in which the keys 37 are supported by the lower refractory section. A depth of tin bath above the slabs 36 is maintained at a level of from ½ to 4 inches in order to reduce the likelihood of the glass ribbon coming into contact with the slabs 36 if and when the glass ribbon buckles within the chamber 16.

PRIOR ART CONSTRUCTION

Figure 3:
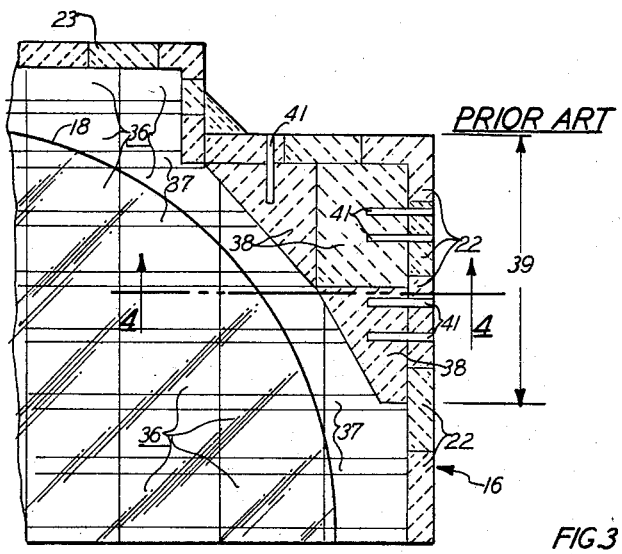
FIGURE 3 is a partial, plan view of a prior art float chamber.
Figure 4:
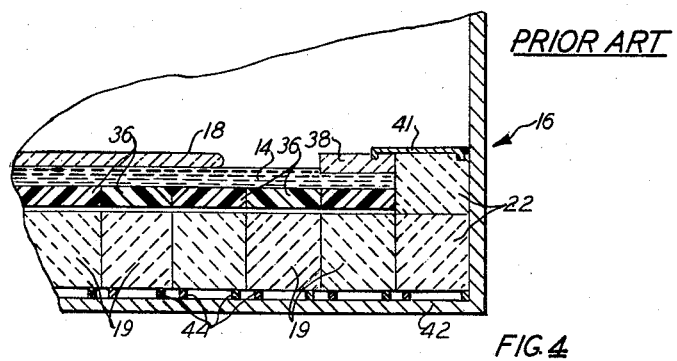
FIGURE 4 is a cross sectional view of the prior art float chamber taken along line 4—4 of FIGURE 3.

With reference to FIGURES 3 and 4, a float chamber of prior art construction is shown therein. In the prior art construction, floating refractory tiles 38 were located in the corners of the flow-out zone 39 of the chamber 16. The floating refractory tiles were held in position on the molten tin bath 14 by means of hooks 41 which were welded to and extended from the chamber's sidewall.

As may best be seen in FIGURE 4, in the prior art construction the carbonaceous liner blocks 36 in the flow-out zone 39 of the chamber 16 extended under the floating refractory tiles 38 all the way into engagement with the sidewall liner blocks 22. The liner blocks 36 extended to such a position for the full length of the flow-out zone 39. As is best sen in FIGURE 3, the glass ribbon 18 flows out from the pool thereof at the entrance end of the flow-out zone in such a manner that the glass ribbon diverges as it progresses in a direction downstream of the entrance of the chamber. The floating refractory tiles 38 were contoured slightly so as to allow the ribbon to flow freely to its desired equilibrium thickness and were utilized to cover the molten tin 14 in areas where the ribbon did not cover the same.

In the prior art float chamber construction, the carbonaceous liner blocks 36 and the molten tin 14 extended all the way out under the floating refractory block 38 and allowed heat to be conducted through both the sidewall refractory 22 and the bottom refractory 19 and then dissipated to the atmosphere outside the chamber. Since the flow-out zone 39 of the chamber 16 is the hottest portion of the chamber, because the molten glass is introduced at a high temperature and electrical heaters provide additional heat to maintain sufficient heat in the zone to permit the ribbon to flow out to equilibrium thickness, a great deal of heat was lost by conduction through the walls of the chamber. The heat loss had to be made up, of course, by increasing the heat input into the chamber 16 in the flow-out zone.

CONSTRUCTION OF THE IMPROVED CHAMBER

The construction of the improved chamber of this invention is best disclosed in FIGURES 5 and 6. As best seen in FIGURE 6, the improved chamber of this invention has full depth sidewall blocks 22. These blocks extend from the base or bottom wall 42 of the chamber 16 to a height above the molten tin bath 14. As is best seen in FIGURE 5, the sidewall blocks 22 are shaped on each side of the chamber 16 so that they diverge from the center of the chamber at a rate substantially equal to the rate of divergence of the edge of the glass ribbon 18 on the tin 14. The refractory block 22 may have a liner 43 of carbonaceous material therealong to prevent adherence of glass to the refractory block 22 if the glass ribbon 18 ruptures and moves toward engagement with the sidewall of the chamber.

Figure 7:
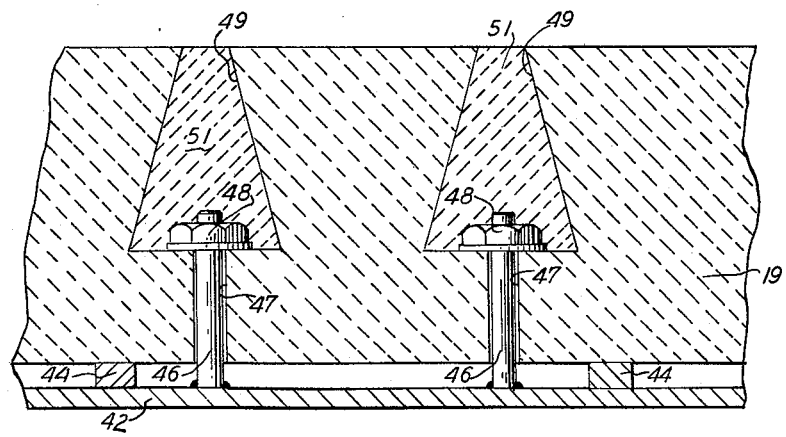
FIGURE 7 is a general view showing the manner in which refractory ceramic material is secured to the bottom outside wall of the chamber.

The refractory bottom block 19, as well as the side refractory block 22, is anchored to the bottom of the chamber 42 in a manner such as depicted in FIGURE 7. More particularly, each refractory block is supported above the bottom casing or shell 42 on refractory or steel shims 44. Bolts 46 are welded to the bottom casing 42 and extend upwardly through openings 47 in the refractory block 19. A washer and nut assembly 48 is inserted into openings 49 in the block and then secured to the bolt. The openings 49 are then filled with a refractory mix 51 which is compacted to form a dense media similar to the refractory block.

The utilization of a contoured, full depth sidewall which diverges outwardly from a position spaced laterally away from the molten pool of glass at the entrance end of the chamber 16 reduces the amount of heat which must be supplied to the flow-out zone of the chamber. More particularly, since full-depth blocks are utilized in a contoured fashion in the entrance area of the chamber, the graphite liner slabs 36 and the molten tin bath 14 do not extend outwardly in this area of the chamber to a position adjacent the outside sidewalls of the chamber. The liner slabs 36 and the molten tin 14 are reduced in lateral width and they do not act as a heat transporting media to conduct heat from the central part of the chamber in the flow-out zone thereof. Also, since heat losses from the flow-out zone are reduced, the temperature profile across the chamber is more uniform. The uniform temperature profile also aids in establishing a uniform, almost constant, temperature profile across the glass ribbon in the flow-out zone. Such a uniform, almost constant, temperature profile in the glass ribbon is beneficial in that it promotes a flowing out of the glass ribbon to an equilibrium thickness without development of distortions in the glass. Thus, it is seen that by such a construction the heat losses from the flow-out zone of the chamber are substantially reduced and a more uniform, almost constant temperature profile is developed across the glass ribbon in the flow-out zone of the chamber.

What is claimed is:

1. A chamber utilized to manufacture flat glass, which chamber has a substantially constant width along the initial portion thereof containing a flowout and ribbon forming zone, the chamber comprising: a plurality of refractory ceramic bottom blocks; a plurality of refractory ceramic sidewall blocks; means for positioning said bottom blocks closely adjacent one another to define the bottom of a cavity; means for positioning said sidewall blocks in association with said bottom blocks so that said sidewall blocks extend above said bottom blocks whereby all of said blocks define said cavity; a liner of graphite material overlying said bottom blocks at least in the area of the glass flow-out and ribbon forming zone of the chamber, said graphite liner terminating at the sidewalls of said cavity; molten tin received in said cavity; said sidewall blocks being so positioned with respect to said bottom blocks by said sidewall positioning means that said sidewall of said cavity diverge from one another along at least said flow-out zone of the chamber at a rate of divergence substantially equal to the rate of divergence of molten glass flowing out of a continuously maintained pool of molten glass supported on said tin at the entrance end of said flow-out zone of said chamber, whereby the thickness of the sidewalls of the chamber decreases from the entrance of the chamber in a direction downstream of the chamber, and whereby heat loss from said flow-out zone of the chamber through the sidewalls of the chamber is substantially reduced by increasing the thickness of said sidewalls and reducing the width of both said graphite liner and said tin in said flow-out zone.

2. The chamber for the manufacture of flat glass as defined in claim 1 wherein said sidewall refractory ceramic blocks have a liner of graphite material therealong at least in said flow-out zone of the chamber.

References Cited

UNITED STATES PATENTS 3,393,061    7/1968    Greenler et al. _____ 65—99

OTHER REFERENCES

South African application, no. 635,217, Nov. 18, 1963.

S. LEON BASHORE, Primary Examiner

E. R. FREEDMAN, Assistant Examiner

U.S. Cl. X.R.

65—65, 99; 165—146